(12) United States Patent
Ling et al.

(10) Patent No.: US 10,944,664 B2
(45) Date of Patent: Mar. 9, 2021

(54) ESTIMATING BANDWIDTH IN A HETEROGENEOUS WIRELESS COMMUNICATION SYSTEM

(71) Applicants: Alcatel-Lucent USA Inc., Murray Hill, NJ (US); Alcatel-Lucent Ireland Ltd., Dublin (IE); Alcatel-Lucent India Limited, Chennai (IN)

(72) Inventors: Jonathan Ling, North Brunswick, NJ (US); David Lopez-Perez, Blanchardstown (IE); Bongho Kim, Morganville, NJ (US); Vasudevan Subramanian, Morristown, NJ (US); Satish Kanugovi, Bangalore (IN)

(73) Assignees: Nokia of America Corporation, Murray Hill, NJ (US); Alcatel Lucent, Nozay (FR)

( * ) Notice: Subject to any disclaimer, the term of this patent is extended or adjusted under 35 U.S.C. 154(b) by 653 days.

(21) Appl. No.: 15/254,797

(22) Filed: Sep. 1, 2016

(65) Prior Publication Data

US 2018/0063748 A1 Mar. 1, 2018

(51) Int. Cl.
*H04W 28/18* (2009.01)
*H04W 48/20* (2009.01)
(Continued)

(52) U.S. Cl.
CPC .......... *H04L 43/16* (2013.01); *H04L 43/0858* (2013.01); *H04L 43/0894* (2013.01);
(Continued)

(58) Field of Classification Search
CPC ..... H04L 47/10; H04L 47/2441; H04L 47/30; H04L 47/32; H04L 12/5693
(Continued)

(56) References Cited

U.S. PATENT DOCUMENTS 7,995,493 B2 * 8/2011 Anderlind ............. H04L 41/147
370/252
8,072,901 B1 * 12/2011 Blair ....................... H04L 45/00
370/254

(Continued)

OTHER PUBLICATIONS

Wireless Unified Networks | Nokia Networks, <https://networks.nokia.com/solutions/wireless-unified-networks, Accessed Dec. 1, 2016, 6 pages.

*Primary Examiner* — Peter G Solinsky
*Assistant Examiner* — Sanjay K Dewan

(57) ABSTRACT

A base station provides, a first number of probe packets to an access point for transmission to a user equipment over an access network path. The base station receives information indicating a bandwidth of the access network path estimated by the user equipment. The base station determines which of the base station or the access point to use for communication with the user equipment based on the bandwidth. The user equipment receives a second number of packets over an air interface and determines inter-arrival packet delays for the second number of probe packets. The user equipment estimates the bandwidth of the air interface based on the inter-arrival packet delays, the first number, and a time interval for transmission of the first number of probe packets. The user equipment transmits information indicating the bandwidth.

20 Claims, 6 Drawing Sheets

(51) Int. Cl.
*H04L 12/26* (2006.01)
*H04W 48/14* (2009.01)

(52) U.S. Cl.
CPC ............ *H04W 48/20* (2013.01); *H04L 43/10* (2013.01); *H04W 48/14* (2013.01)

(58) Field of Classification Search
USPC ........................................................ 370/235
See application file for complete search history.

(56) References Cited

U.S. PATENT DOCUMENTS

| | | | | |
|---|---|---|---|---|
| 8,914,537 | B2 * | 12/2014 | Zhu | H04W 28/02 |
| | | | | 370/235 |
| 9,301,161 | B2 * | 3/2016 | Vitthaladevuni | H04W 48/18 |
| 9,813,259 | B2 * | 11/2017 | Vasseur | H04L 12/4641 |
| 2003/0185210 | A1 * | 10/2003 | McCormack | H04L 43/50 |
| | | | | 370/392 |
| 2012/0243415 | A1 * | 9/2012 | Nishioka | H04W 28/18 |
| | | | | 370/235.1 |
| 2015/0333856 | A1 * | 11/2015 | Hayter | H04J 3/06 |
| | | | | 370/328 |
| 2016/0135210 | A1 * | 5/2016 | Nammi | H04W 72/1231 |
| | | | | 370/329 |
| 2017/0063702 | A1 * | 3/2017 | Mani | H04N 21/2335 |

* cited by examiner

ESTIMATING BANDWIDTH IN A HETEROGENEOUS WIRELESS COMMUNICATION SYSTEM

BACKGROUND

Field of the Disclosure

The present disclosure relates generally to wireless communication systems and, more particularly, to bandwidth in wireless communication systems.

Description of the Related Art

Heterogeneous wireless communication systems include base stations (or eNodeBs) and access points that operate according to different radio access technologies. For example, a heterogeneous wireless communication system can provide wireless coverage to user equipment in overlapping coverage areas associated with a base station that provides wireless connectivity in a licensed frequency band according to Long Term Evolution (LTE) standards and an access point that provides wireless connectivity in an unlicensed frequency band according to Wi-Fi standards, e.g., one or more IEEE 802 standards. Unlicensed frequency bands are portions of the radiofrequency spectrum that do not require a license for use and may therefore be used by any device to transmit or receive radiofrequency signals. For example, the Unlicensed National Information Infrastructure (UNII) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider or license holder.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
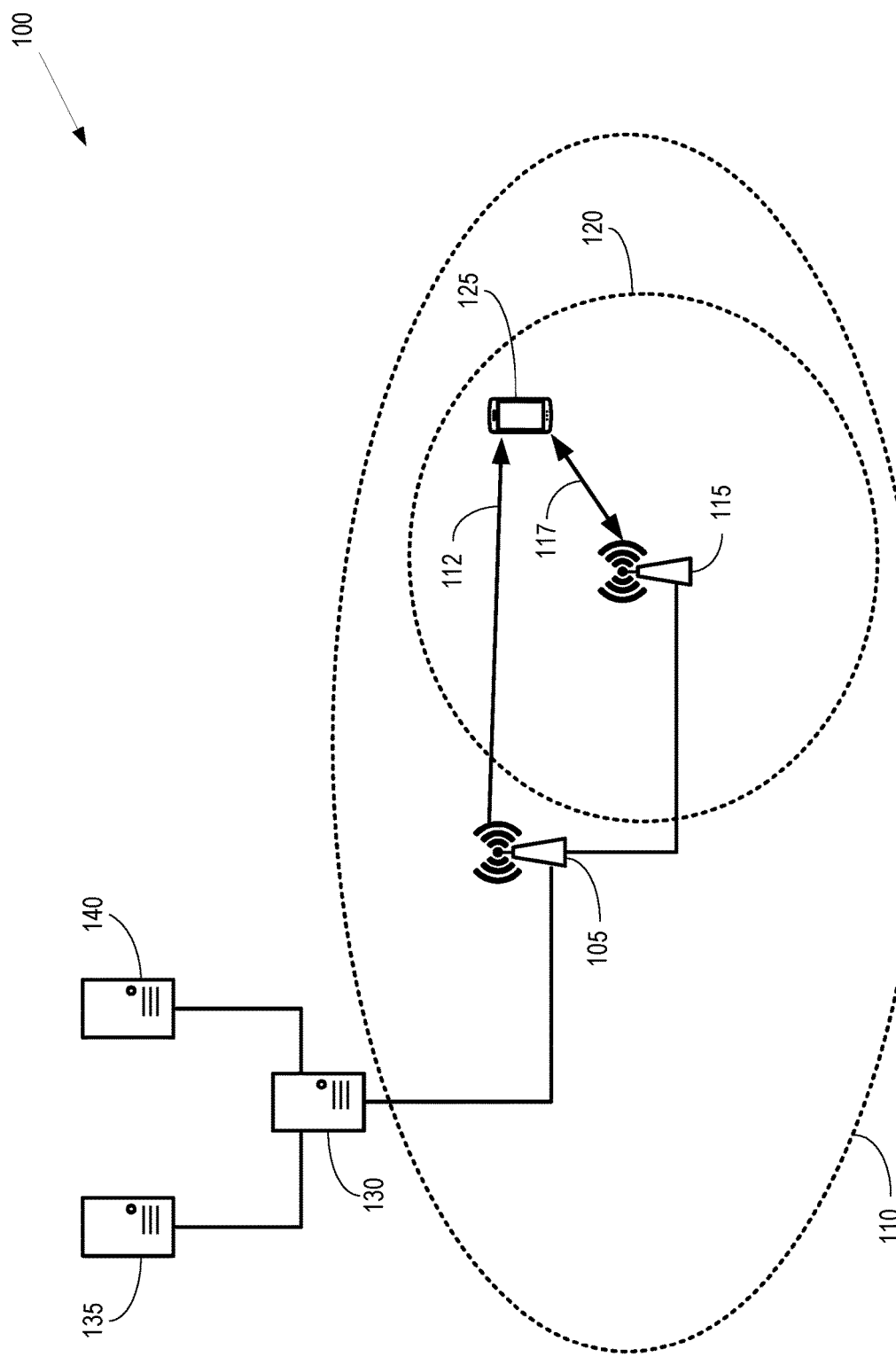
FIG. 1 is a diagram of a wireless communication system according to some embodiments.

User equipment typically include multiple radio modems to access the wireless communication system over air interfaces in the licensed frequency band (e.g., according to LTE standards) and the unlicensed frequency band (e.g., according to Wi-Fi standards). The user equipment can therefore switch between accessing the wireless communication system using the licensed frequency band or the unlicensed frequency band. Estimates of the available bandwidth of an access network path between an access point and user equipment can be used to choose between the licensed and unlicensed frequency bands. For example, to the Wi-Fi access point can become a bottleneck if the bandwidth over the air interface in the unlicensed frequency band falls below a threshold because of cross traffic interference. In that situation, the user equipment can choose to switch to the licensed frequency band. For another example, the user equipment can switch from the licensed frequency band to the unlicensed frequency band to reduce user costs or support load-balancing. However, the user equipment should only switch to the unlicensed frequency band if there is sufficient bandwidth available.

The access point could be configured to report the available bandwidth to the user equipment, but bandwidth reporting would require establishing a trust relationship between the access point and the user equipment. Moreover, conventional third-party access points are not configured to report the available bandwidth and would therefore need to be modified to support this feature. The access point could also generate a data stream for transmission to the user equipment so that the user equipment can measure the bandwidth based on the data stream, e.g., according to the iPerf protocol. However, this approach is time-consuming, typically requiring seconds of data to compute the bandwidth, and can intrusively affect other flows generated by the access point. Moreover, an iperf stream transmitted in the unlicensed frequency band by the access point can create substantial interference that affects neighboring access points. The user equipment could also compare an initial gap between probes generated by the access point with an output gap between the probes that are received by the user equipment. However, aggregation of different packets that include the probes (e.g., according to the packet aggregation protocols defined by IEEE 802.11n/ac) would reduce the output probe gap to zero.

The bandwidth supported by an access point over an air interface (e.g., in an unlicensed frequency band) can be estimated by user equipment based on the delays between packets received by the user equipment from an access over the air interface. The packets include one or more probes that are generated by a testing server and conveyed to the access point for transmission in the unlicensed frequency band. The access point uses a short-time fair scheduler such as a round-robin scheduler that schedules transmission of packets to user equipment during time intervals that are less than 10 milliseconds (ms). The access point is also able to aggregate subsets of probes that include multiple probes received from the base station into a single over-the-air packet transmission when it finds multiple probes or data waiting in its queue. Thus, the number of packets generated by the access points can differ from the number of probe packets received from the base station. In some variations, the test server generates a sequence of probes at fixed time intervals. For example, the test server can generate a probe every 0.5 ms for a probe interval of 100 ms so that 200 probes are generated and provided to the access point for transmission to the user equipment in the unlicensed frequency band.

The user equipment receives the packets including the probes and determines inter-arrival delays between the packets. The received packets are sorted into a first group or subset that includes packets having inter-arrival delays that are greater than a threshold that indicates that the received packet is an aggregate packet that includes aggregated probes, e.g., a threshold of 0.5 ms plus an offset. A second group or subset includes packets having inter-arrival delays that are less than or equal to the threshold, which indicates that the packets include single un-aggregated probes. The available bandwidth is then computed based on the fraction of time the unlicensed frequency band is congested (as indicated by the first group of aggregated packets) and the fraction of time the unlicensed frequency band is uncongested (as indicated by the second group of un-aggregated packets).

FIG. 1 is a diagram of a wireless communication system 100 according to some embodiments. The wireless communication system 100 includes one or more base stations 105 that provide wireless connectivity according to a first radio access technology (RAT), e.g., according to the LTE standards defined by the Third Generation Partnership Project (3GPP). The base station 105 can also be referred to as an eNodeB, a base station router, or using other terms. The base station 105 provides wireless connectivity within a first geographical area or cell 110 over an air interface 112. The wireless communication system 100 also includes one or more access points 115 that provide wireless connectivity according to a second RAT such as Wi-Fi, as defined by the IEEE 802 standards. Access points can be referred to as home base station routers, metrocells, microcells, picocells, femtocells, and the like. The access point 115 provides wireless connectivity within a second geographical area or cell 110, which fully or partially overlaps with the cell 110, via an air interface 117. Some variations of the access point 115 are co-located with the base station 105. Alternatively, the base station 105 and the access point 115 can be connected by an interface or a network such as a local Internet protocol (IP) subnetwork.

Some embodiments of the base station 105 or the access points 115, 120 operate according to fifth-generation (or 5G) standards for wireless communication. The 5G standards specify data rates of tens of megabits per second that can be supported for tens of thousands of concurrent users, several hundreds of thousands of simultaneous connections, improved spectral efficiency relative to LTE, reduce latency relative to LTE, and the like.

The base station 105 provides uplink or downlink communications to user equipment 125 over one or more carriers in a licensed frequency band within the cell 110. Examples of user equipment 125 include wireless communication devices that operate according to LTE, machine-to-machine (M2M) devices, smart phones, mobile terminals, wireless-enabled tablets, wireless network interface cards, Wi-Fi sticks, radio transceivers integrated with sensors, 5G transceivers, 5G radio terminals, and the like. The licensed carriers operate according to the first RAT and may be referred to as LTE licensed (LTE-L) carriers.

The access point 115 supports wireless connectivity over carriers in one or more unlicensed frequency bands according to the second RAT within the cell 110. For example, the access points 115, 120 can support wireless connectivity over carriers that operate according to conventional Wi-Fi or carrier-grade Wi-Fi, which supports additional functionality such as user authentication, mobility management, and the like. The unlicensed frequency bands may include the Unlicensed National Information Infrastructure (UNIT), which is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. in some variations, the access point 115 implements a short-time fair scheduler such as a round-robin scheduler that schedules transmission of packets over the air interface during time intervals that are less than 10 ms.

The wireless communication system 100 also includes a packet data network gateway (PGW) and a serving gateway (SGW) that are implemented in one or more servers 130. Although a single server 130 is illustrated in FIG. 1, some embodiments of the wireless communication system 100 implement the PGW or the SGW in more than one server. The PGW and the SGW include control and data plane stacks to support interfaces between the base station 105 and a mobility management entity (not shown in FIG. 1). The server 130 provides a gateway and interfaces to an application server 135 and an IP mobility subsystem (IMS) server 135 that supports voice communication, e.g., according to Voice over LTE (VoLTE) standards.

The base station 105 and the access point 115 can be operated in a coordinated manner to improve performance of the wireless communication system 100. For example, a Wi-Fi "boost" mode supports downlink communication from the access point 115 to the user equipment 125 over the air interface 117 in the unlicensed frequency band and uplink communication from the user equipment 125 to the base station 105 in the licensed frequency band over the air interface 112. The Wi-Fi boost mode combines Wi-Fi's typically high capacity and fast downlink speeds with the fast uplink speeds and broad range supported by cellular communication (e.g., according to LTE). For another example, a cellular boost mode aggregates downlink channels from the access point 115 to the user equipment 125 in the unlicensed frequency band with downlink channels from the base station 105 to the user equipment 125 in the licensed frequency band. The cellular boost mode uses uplink channels from the user equipment 125 to the base station 105 in the licensed frequency band. The cellular boost mode can dramatically increase the downlink data rate and improve cell edge performance. The user equipment 125 therefore has the ability to transmit or receive information via two access network paths: (1) an access network path from the base station 105 over the air interface 112 to the user equipment 125 or (2) an access network path from the base station 105 to the access point 115 and over the air interface 117 to the user equipment 125.

The base station 105 is configured to selectively utilize the different access network paths based on available bandwidth in one or more of the access network paths. Some embodiments of the base station 105 are configured to selectively utilize the licensed frequency band of the air interface 112 or the unlicensed frequency band of the air interface 117 supported by the access point 115 based on the available bandwidth in the unlicensed frequency band or other portions of the access network path. For example, depending on the available bandwidth in the unlicensed frequency band, the base station 105 can selectively operate in a Wi-Fi or cellular boost mode or switch wireless connectivity between the licensed frequency bands supported by the base station 105 and the unlicensed frequency band supported by the access point 115. In order to estimate the bandwidth in the unlicensed frequency band, the base station 105 generates a stream of probe packets and provides the stream to the access point 115, which can then transmit the probe packets to the user equipment 125. The access point 115 can aggregate multiple probe packets into single packets for transmission depending on interference or channel quality over the air interface. For example, the access point 115 can aggregate multiple probe packets into a single packet data unit in response to determining that there is significant traffic in the unlicensed frequency band. Aggregation can be performed by a short-time fair scheduler implemented by the access point 115. The user equipment 125 receives the packets transmitted by the access point 115 and determines inter-arrival packet delay times for the packets. The user equipment 125 can then estimate a bandwidth in the unlicensed frequency band based on the inter-arrival packet delay times, the number of probe packets in the stream received by the access point 115 from the base station 105, and a time interval for transmission of the stream of probe packets. The base station 105 receives information indicating the estimated bandwidth and determines whether to use licensed or unlicensed frequency band for communication with the user equipment 125 based on the bandwidth.

In some variations, information indicating the estimated bandwidth over the air interface 117 between the access point 115 and the user equipment 125 (or the access network path between the base station 105 and the user equipment 125 via the access point 115) can be used in conjunction with estimates of the bandwidth between the base station 105 and the user equipment 125 to perform channel switching or channel aggregation. For example, the user equipment 125 can be switched between the base station 105 and the access point 115 based on a comparison of the estimated bandwidths provided by the base station 105 and the access point 115. A channel between the base station 105 and the user equipment 125 is used if it provides a higher estimated bandwidth and a channel between the access point 115 and the user equipment 125 if it provides a higher estimated bandwidth. For another example, channels supported by the base station 105 and the access point 115 can be aggregated and the number of packets that are transmitted on each channel can be determined based on the estimated bandwidth for the corresponding channel.

Figure 2:
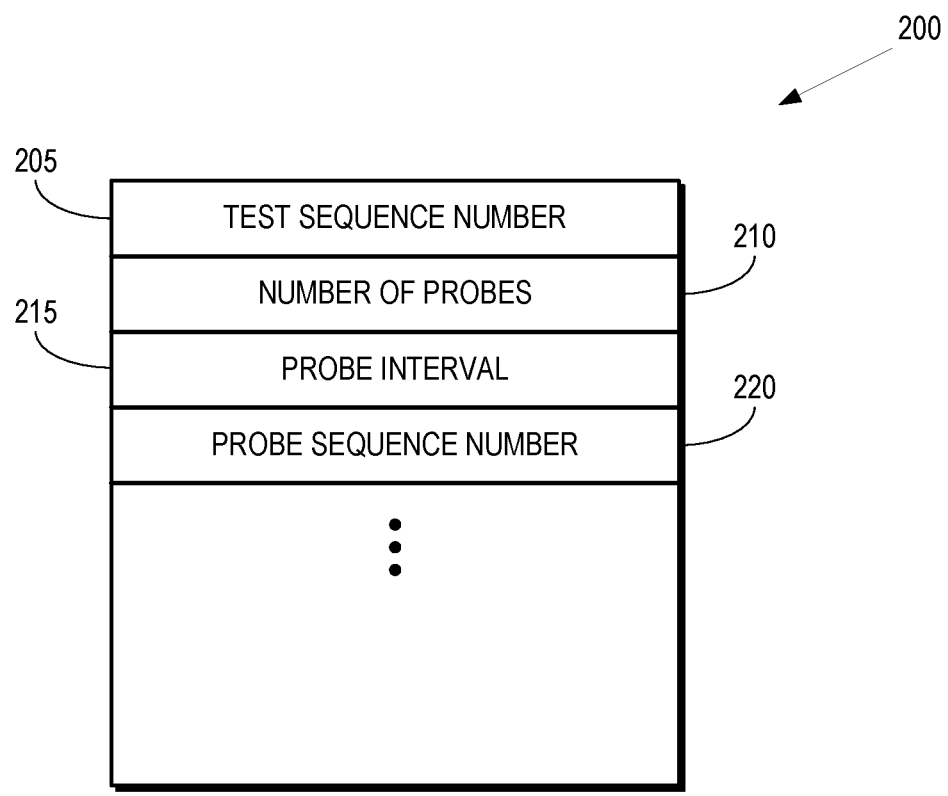
FIG. 2 is a block diagram illustrating a probe packet that can be generated by a base station for transmission by an access point according to some embodiments.

FIG. 2 is a block diagram illustrating a probe packet 200 that can be generated by a base station for transmission by an access point according to some embodiments. The probe packet 200 includes a first field 205 that includes a test sequence number that identifies the stream that is being generated by the base station to test the bandwidth available between the access point and a user equipment. The test sequence number in the first field 205 is used to distinguish between different streams that are used to test the available bandwidth at different times. The probe packet also includes a second field 210 that includes a value that indicates a number of probes in the test sequence and a third field 215 that includes a value that indicates a probe interval that separates each of the probes in the test sequence. A duration of the test window corresponding to the stream can be determined by multiplying the number of probes by the probe interval. For example, the second field 210 can include a value of 200 and the third field 215 can include a value of 0.5 to indicate that the stream includes 200 probe packets generated at a probe interval of 0.5 ms. Multiplying the number of probes by the probe interval determines that the duration of the test sequence is 100 ms. The probe packet 200 also includes a fourth field 220 that includes a sequence number for the probe so that the different probes can be distinguished from each other. In some embodiments, one or more of the fields 205, 210, 215 can be transmitted in a separate packet or only in the first packet of the stream since the fields 205, 210, 215 include information that refers to all of the probe packets in the stream. Some embodiments of the probe packet 200 also include additional information such as an IP address of the user equipment or a port number that is assigned to the probe packets so that the user equipment can identify the packets that are part of the stream used to estimate the bandwidth.

Figure 3:
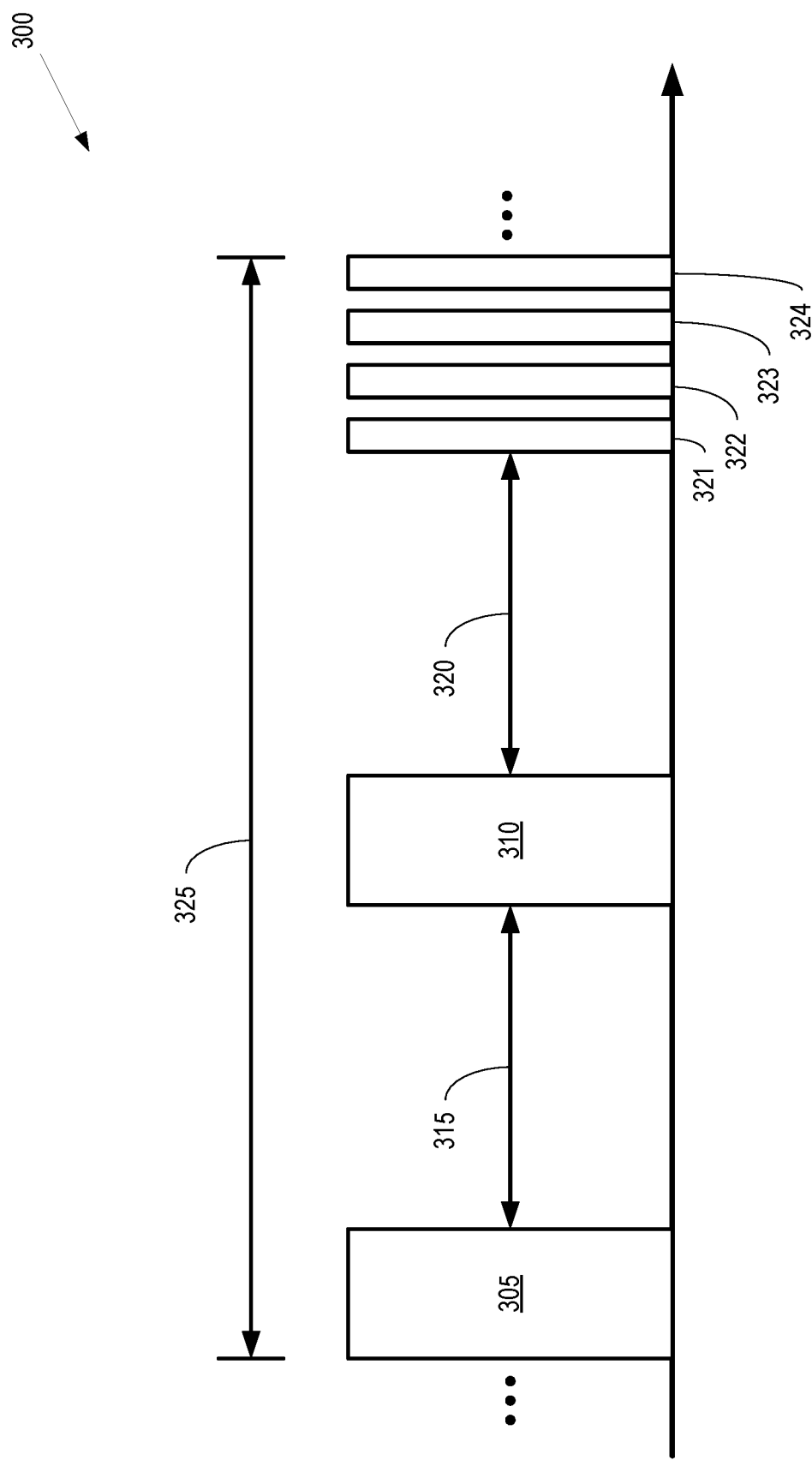
FIG. 3 is a diagram illustrating a sequence of aggregated packets received by a user equipment from an access point according to some embodiments.

FIG. 3 is a diagram illustrating a sequence 300 of aggregated packets received by a user equipment from an access point according to some embodiments. The sequence 300 can be generated by some embodiments of the access point 115 by selectively aggregating probe packets generated by the base station 105 shown in FIG. 1. The sequence 300 can also be received by some embodiments of the user equipment 125 shown in FIG. 1.

The sequence 300 includes aggregated packets 305, 310 that are formed by aggregating more than one probe packet provided by the base station. For example, the access point can bypass transmission of one or more probe packets due to interference from other traffic in the unlicensed frequency band. The access point can then aggregate the bypassed packets into a single aggregated packet such as the aggregated packets 305, 310. Consequently, the aggregated packets 305, 310 are separated by time intervals or inter-arrival packet delays 315, 320 that are longer than the probe intervals of the probe packets that are aggregated into the aggregated packets 305, 310.

The sequence 300 also includes non-aggregated packets 321, 322, 323, 324, which are collectively referred to herein as the non-aggregated packets 321-324. Each of the non-aggregated packets 321-324 are generated based on a single probe packet provided by the base station. The non-aggregated packets 321-324 are therefore transmitted at intervals equal to the probe interval of the probe packets generated by the base station.

The user equipment determines numbers of aggregated packets 305, 310 and non-aggregated packets 321-324 received in the stream during a measurement interval 325. For example, a kernel interface implemented in the user equipment can append a radiotap header to each of the received packets 305, 310, 321-324. Radiotap headers can be added to received frames or packets at the time of capture, e.g., by an analysis application implemented by the user equipment. Radiotap headers can also be referred to as cross-layer information because they are appended to a frame or a packet as the frame or packet is passed from one layer to another in a protocol stack implemented by the user equipment. The radiotap header can include information indicating an identifying number of a packet data unit, which can be used to determine arrival times of the packets 305, 310, 321-324. Kernel timestamps applied to the received packets can also be used to determine arrival times of the packets 305, 310, 321-324. The user equipment then determines a number of scheduling grants associated with the packets received during the measurement window 325. The number of scheduling grants is equal to the number of distinct packets received by the user equipment, which includes the aggregated packets 305, 310 and the non-aggregated packets 321-324. The number of scheduling grants can be determined using information in the radiotap header or by comparing arrival times of the packets using a local hardware clock implemented in the user equipment.

The user equipment can determine inter-arrival packet delays between the packets 305, 310, 321-324. For example, the user equipment can determine the inter-arrival packet delays 315, 320, as well as the inter-arrival packet delays between the non-aggregated packets 321-324. The inter-arrival packet delays 315, 320 are larger than the probe interval for the stream of probe packets that was used to generate the packets 305, 310, 321-324. The inter-arrival packet delays between the non-aggregated packets 321-324 is equal to the probe interval for the stream of probe packets. The inter-arrival packet delays can therefore be sorted into two groups: (1) delays that are larger than the probe interval by a selected tolerance and (2) delays that less than or equal to the probe interval plus the selected tolerance. The first group is referred to as a cross traffic set because larger inter-arrival packet delays are likely caused by interference by other traffic in the unlicensed frequency band. The second group is referred to as the free airtime set because packets that arrive separated by an interval that is equal to the probe interval are likely transmitted without interference from other traffic in the unlicensed frequency band. The number of packets in the first group can differ from the number of packets in the second group.

The user equipment can estimate bandwidth in the unlicensed frequency band based on a fraction of the measurement time interval 325 used to transmit non-aggregated packets 321-324 and an average ($\delta_{AC}$) of the inter-arrival packet delays 315, 320 for the aggregated packets 305, 310. Some embodiments of the user equipment determine the duration of a free airtime interval used to transmit the non-aggregated packets 321-324 by adding up the number of non-aggregated packets 321-324 and multiplying by the probe interval. A fraction of time ($\upsilon$) used to transmit the non-aggregated packets 321-324 is equal to the free airtime interval divided by the measurement time interval 325. In some variations, the user equipment estimates the bandwidth according to greedy bandwidth usage by the probing user equipment. For example, the greedy downlink bandwidth ($BW_{AG}$) can be estimated as:

$$BW_{AG} = \left[ (1-\upsilon) \frac{\tau_{TXOP} - \tau_{OVHD}}{\delta_{AC} + (1+\alpha)\tau_{TXOP}} + (\upsilon) \frac{\tau_{TXOP} - \tau_{OVHD}}{(1+\alpha)\tau_{TXOP}} \right] MCS_{DL}$$

In some variations, the maximum packet length for downlink packets is limited to $T_{TXOP}=3.0$ ms, the average total overhead for the packets (e.g., the 802.11n MAC overhead) is $\tau_{OVHD}=300$ μs, and the modulation and coding scheme used for the downlink packets is $MCS_{DL}$. The modulation and coding scheme can be determined using information included in the radiotap header. The parameter a is an estimate of the fractional uplink airtime generated assuming full usage of the downlink transmission opportunities (DL TXOP). The transmission control protocol can generate uplink acknowledgments (ACK/NACK), which should be accounted for in computing the available downlink bandwidth. The user equipment can then report the estimated bandwidth to the base station in a message that includes the test sequence number so that the base station can correlate the bandwidth with the appropriate test sequence.

Figure 4:
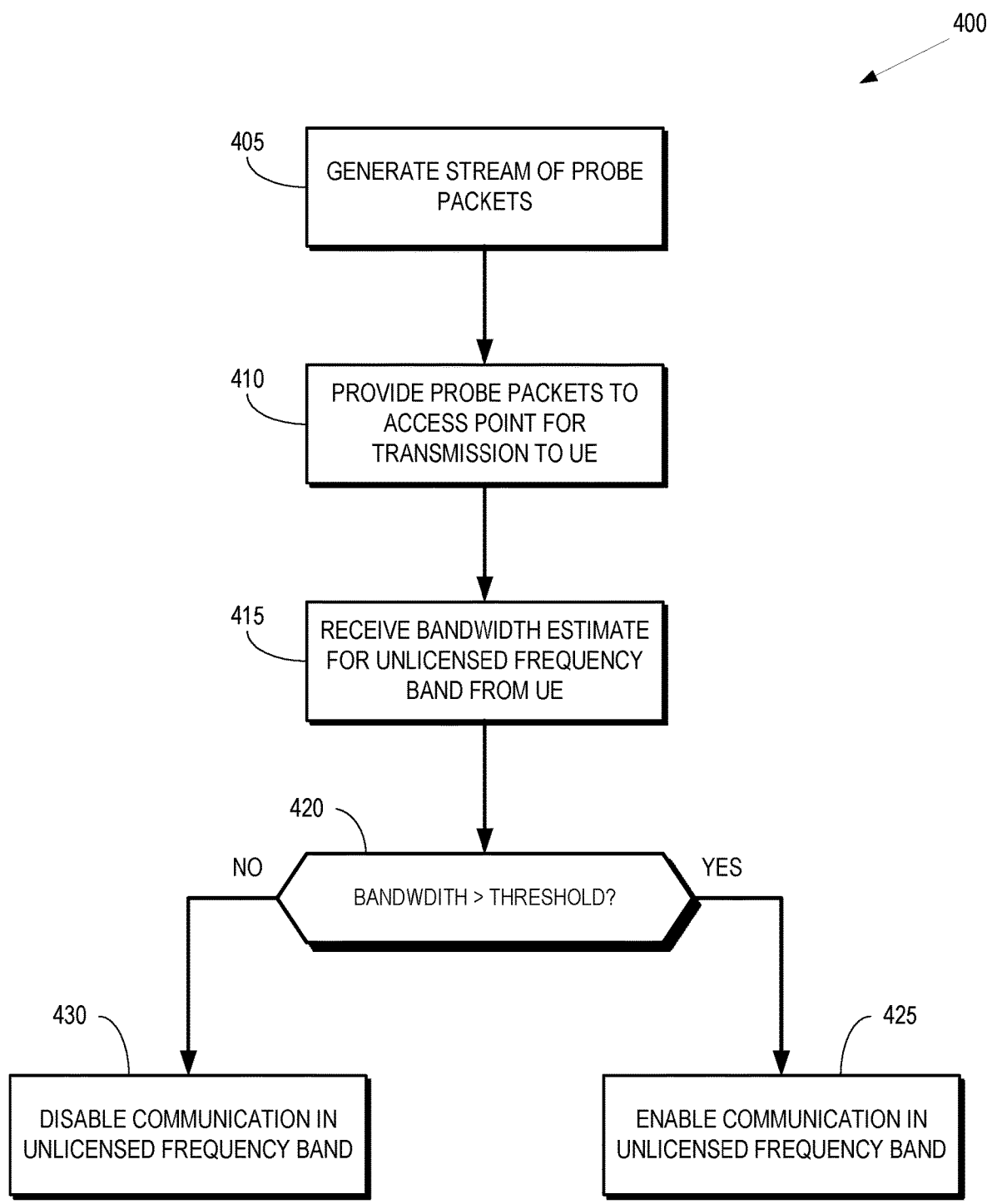
FIG. 4 is a flow diagram of a method for selectively utilizing an unlicensed frequency band based on an estimate of the bandwidths in the unlicensed frequency band according to some embodiments.

FIG. 4 is a flow diagram of a method 400 for selectively utilizing an unlicensed frequency band based on an estimate of the bandwidths in the unlicensed frequency band according to some embodiments. The method 400 is implemented in some embodiments of the base station 105 shown in FIG. 1. For example, the method 400 can be implemented by a radio connection manager and a multilink scheduler in the base station 105. Some embodiments of the method 400 can therefore be used to estimate the bandwidth over an air interface between a user equipment and an access point such as the access point 115 shown in FIG. 1 or a bandwidth of an access network path from a base station to user equipment via an access point.

At block 405, the base station generates a stream of probe packets. For example, the stream of probe packets can include a predetermined number of probe packets (such as 200) that are transmitted at probe intervals (such as one probe packet every 0.5 ms). At block 410, the base station provides the stream of probe packets to an access point for transmission to the user equipment in an unlicensed frequency band supported by the access point. As discussed herein, the base station also provides information indicating the parameters of the stream, such as a sequence number of the test, a number of probe packets, a probe interval, and sequence numbers of each of the probe packets. Some or all of the information can be provided in each probe packet, in a first probe packet in the stream, or in a separate packet that is provided in conjunction with the stream of probe packets.

At block 415, the base station receives information indicating a bandwidth estimate in the unlicensed frequency band that is determined by the user equipment. As discussed herein, the bandwidth is estimated by the user equipment using packets that are generated by the access point based on the stream of probe packets and then transmitted to the user equipment. Information indicating the parameters of the stream are also provided to the user equipment so that the user equipment can use this information to estimate the bandwidth. For example, the user equipment receives information indicating the probe interval for the stream and compares inter-arrival packet delay times to the probe interval for the stream (and, optionally, a selected tolerance) to categorize received packets as part of a cross traffic set or a free airtime set.

At decision block 420, the base station compares the estimated bandwidth to a threshold value that indicates whether the unlicensed frequency band can support a sufficiently high bandwidth. In some variations, the threshold value is set to a value that indicates that using the unlicensed frequency band supported by the access point for communication with the user equipment increases overall throughput to the user equipment, e.g., by aggregating the unlicensed frequency band with the licensed frequency band supported by the base station in a boost mode.

If the bandwidth is greater than or equal to the threshold value, the base station enables communication in the unlicensed frequency band at block 425. Enabling communication in the unlicensed frequency band can include switching communication with the user equipment from the licensed frequency band to the unlicensed frequency band or aggregating the unlicensed frequency band with the licensed frequency band to support a boost mode.

If the bandwidth is less than the threshold value, the base station disables communication in the unlicensed frequency band at block 430. Disabling communications in the unlicensed frequency band can include switching communication with the user equipment from the unlicensed frequency band to the licensed frequency band or disaggregating the unlicensed frequency band from the licensed frequency band. For example, the user equipment can transition from a boost mode (with the aggregated licensed and unlicensed frequency band communication) to a standard LTE mode in which the user equipment communicates with a base station over a licensed frequency band and does not communicate with an access point over an unlicensed frequency band.

Figure 5:
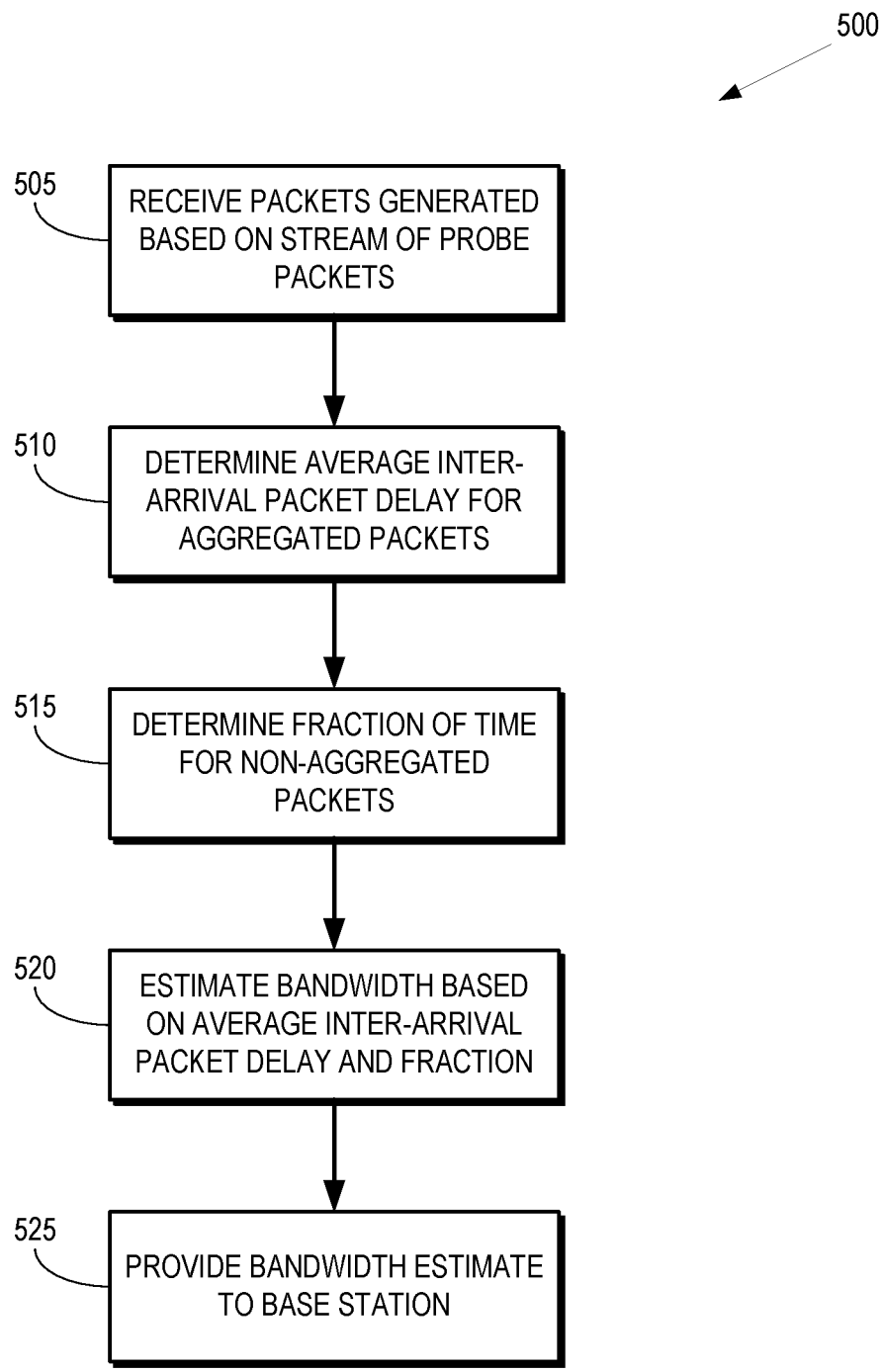
FIG. 5 is a flow diagram of a method for estimating band in an unlicensed frequency band and selectively utilizing the unlicensed frequency band based on the estimate of the bandwidths according to some embodiments.

FIG. 5 is a flow diagram of a method 500 for estimating band in an unlicensed frequency band and selectively utilizing the unlicensed frequency band based on the estimate of the bandwidths according to some embodiments. The method 500 is implemented in some embodiments of the user equipment 125 shown in FIG. 1. For example, the method 500 can be implemented by a connection manager in the user equipment 125. Some embodiments of the method 500 can therefore be used to estimate the bandwidth over an air interface between the user equipment and an access point such as the access point 115 shown in FIG. 1 or a bandwidth of an access network path from a base station to user equipment via an access point.

At block 505, the user equipment receives packets transmitted by an access point over an air interface in the unlicensed frequency band. The packets are generated by the access point based on a stream of probe packets provided by a base station. The packets can include aggregated packets and non-aggregated packets. The aggregated packets are formed from more than one of the probe packets in the stream, e.g., in response to the access point detecting interference due to traffic from other devices in the unlicensed frequency band. The non-aggregated packets are formed from a single probe packet in the stream, e.g., in response to the access point detecting that the unlicensed frequency band is clear, as indicated by a signal-to-noise ratio (SNR) that is above a threshold value, a signal-to-interference-plus-noise ratio (SINR) that is above a threshold value, or other measures of interference in the unlicensed frequency band.

At block 510, the user equipment determines an average inter-arrival packet delay for the aggregated packets such as the average ($\delta_{AC}$) of the inter-arrival packet delays 315, 320 for the aggregated packets 305, 310 shown in FIG. 3. At block 515, the user equipment determines a fraction of time used to convey the non-aggregated packets in the unlicensed frequency band. At block 520, the user equipment estimates the bandwidth in the unlicensed frequency bands based on the average inter-arrival packet delay and the fraction of time used to convey the non-aggregated packets. For example, the user equipment can estimate the greedy downlink bandwidth ($BW_{AG}$), as discussed herein.

At block 525, the user equipment provides information indicating the estimated bandwidth to the base station. The user equipment can provide this information by transmitting the information over the unlicensed frequency band to the access point or over the licensed frequency band directly to the base station. Communication between the user equipment and the access point or base station is then selectively enabled or disabled based on the estimated bandwidth.

Figure 6:
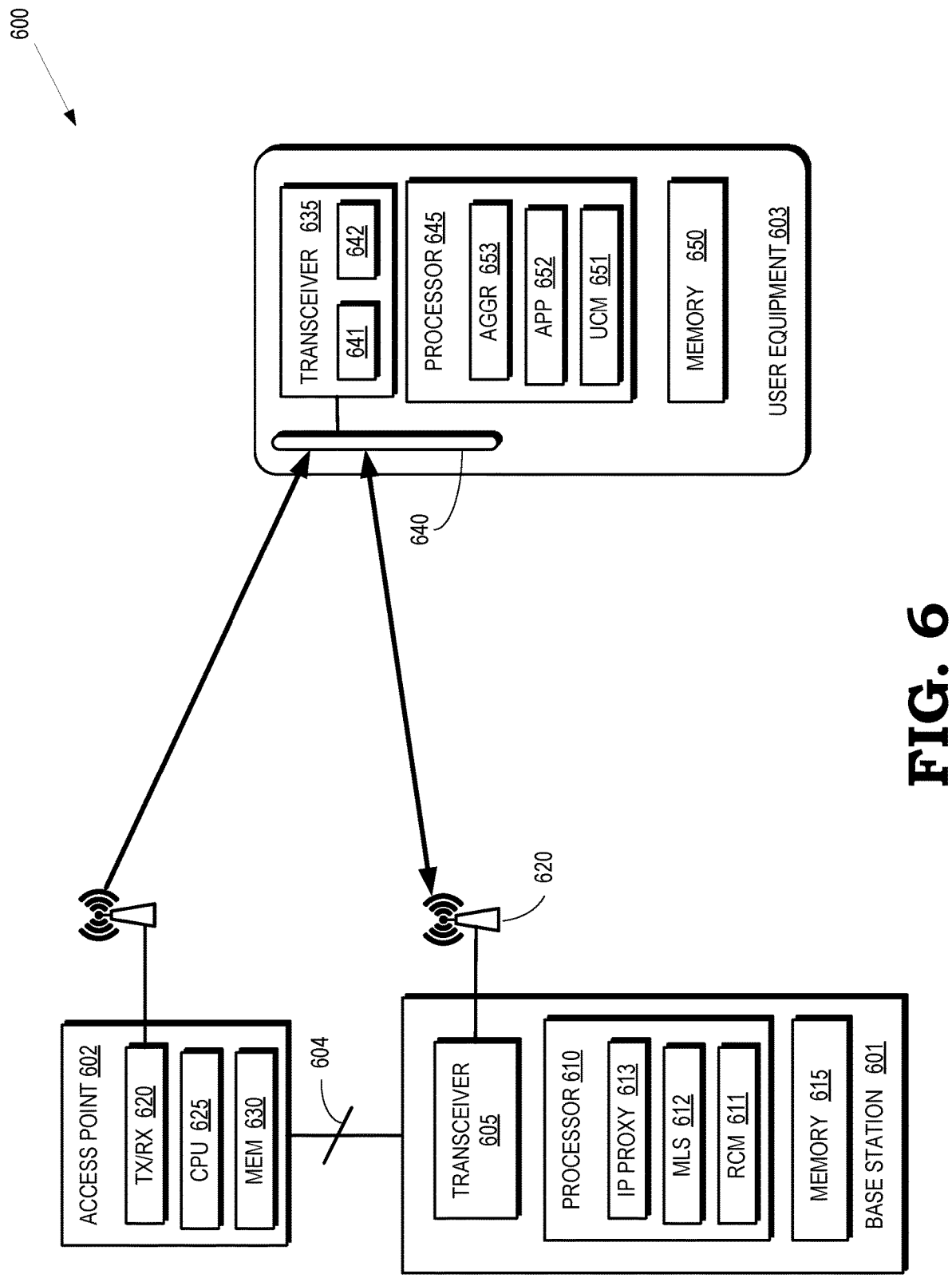
FIG. 6 is a block diagram of a wireless communication system that supports the selective use of unlicensed frequency bands based on an estimated bandwidth of the unlicensed frequency band according to some embodiments.

FIG. 6 is a block diagram of a wireless communication system 600 that supports the selective use of unlicensed frequency bands based on an estimated bandwidth in the unlicensed frequency band according to some embodiments. The communication system 600 implements a base station 601, an access point 602, and user equipment 603. The base station 601 is connected to the access point 602 by a transceiver 605, which can be implemented using combinations of wired or wireless network elements. The base station 601 is used to implement some embodiments of the base station 105 shown in FIG. 1, the access point 602 is configured to in some embodiments of the access point 115 shown in FIG. 1, and the user equipment 603 is used to implement some embodiments of the user equipment 125 shown in FIG. 1.

The base station 601 includes a transceiver 605 for transmitting and receiving signals. The transceiver 605 can be implemented as a single integrated circuit (e.g., using a single ASIC or FPGA) or as a system-on-a-chip (SOC) that includes different modules for implementing the functionality of the transceiver 605. The base station 601 also includes a processor 610 and a memory 615. The processor 610 can be used to execute instructions stored in the memory 615 and to store information in the memory 615 such as the results of the executed instructions.

The processor 610 implements a radio connection manager (RCM) 611 that is configured to support setting up a secure tunnel to the user equipment 603, monitor radio connections in a licensed frequency band and unlicensed frequency band, and provide control signaling to a multilink scheduler (MLS) 612. In response to the control signaling provided by the radio connection manager 611, the multilink scheduler 612 can selectively provide data for transmission in the licensed frequency band by the base station 601 and in the unlicensed frequency band by the access point 602, support a retransmission buffer, insert management packets into a stream of probe packets, queue data, and provide egress shaping on an Ethernet port. The processor 610 also implements and IP proxy 613 that is configured to intercept traffic from the secure tunnel to the user equipment 603, as well as acquiring statistics on a number of users and their associated uplink or downlink traffic. The transceiver 605, the processor 610, and the memory 615 can therefore be configured to implement some portions of the method 400 shown in FIG. 4 and the method 500 shown in FIG. 5.

The access point 602 includes a transceiver (TX/RX) 620 for transmitting and receiving signals. The transceiver 620 can be implemented as a single integrated circuit (e.g., using a single ASIC or FPGA) or as a system-on-a-chip (SOC) that includes different modules for implementing the functionality of the transceiver 620. The access point 602 also includes a processor 625 and a memory 630. The processor 625 can be used to execute instructions stored in the memory 630 and to store information in the memory 630 such as the results of the executed instructions. Some embodiments of the processor 625 also implement short-time fair scheduling of packets for transmission by the transceiver 620. The transceiver 620, the processor 625, and the memory 630 can therefore be configured to implement some portions of the method 400 shown in FIG. 4 and the method 500 shown in FIG. 5.

The user equipment 603 includes a transceiver 635 that is coupled to an antenna 640 for transmitting and receiving signals. The transceiver 635 can be implemented as a single integrated circuit (e.g., using a single ASIC or FPGA) or as a system-on-a-chip (SOC) that includes different modules for implementing the functionality of the transceiver 635. The transceiver also includes multiple radios 641, 642 that are used to support communication in different frequency bands. For example, the radio 641 is configured to support wireless communication over an air interface in a licensed frequency band, e.g., according to the LTE standards. For another example, the radio 642 is configured to support wireless communication over an air interface in an unlicensed frequency band, e.g., according to the Wi-Fi standards.

The user equipment 603 also includes a processor 645 and a memory 650. The processor 645 can be used to execute instructions stored in the memory 650 and to store information in the memory 650 such as the results of the executed instructions. The processor 645 implements a user equipment connection manager (UCM) 651 that is configured to initiate set up of a tunnel in the unlicensed frequency band, e.g., according to the Wi-Fi standard, communicate with the radio connection manager 611 to coordinate selective use of the licensed and unlicensed frequency bands, and generate acknowledgment messages in response to receiving packets generated by the access point 602 based on management packets or probe packets generated by the base station 601. The processor 645 also implements one or more applications 652 and an aggregation module 653 that is configured to detect, process, and disaggregate information in aggregated packets. The transceiver 635, the processor 645, and the memory 650 can therefore be configured to implement some portions of the method 400 shown in FIG. 4 and the method 500 shown in FIG. 5.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   providing, from a base station, probe packets to an access point for transmission from the access point to a user equipment over an access network path;
   receiving, at the base station, information indicating a bandwidth over the access network path estimated by the user equipment based on delays between packets received by the user equipment from the access point over the access network path, wherein the packets are generated by the access point using the probe packets; and
   determining which of the base station or the access point to use for communication with the user equipment based on the bandwidth.

2. The method of claim 1, further comprising:
   providing, from the base station, information indicating at least one of a sequence number associated with the probe packets, a number of probe packets, a probe interval during which the probe packets are transmitted, and sequence numbers associated with each of the probe packets.

3. The method of claim 1, wherein determining which of the base station or the access point to use for communication comprises determining which of the base station or the access point to use for communication based on a comparison of the bandwidth to a threshold value.

4. The method of claim 3, wherein determining which of the base station or the access point to use for communication comprises:
   selecting the access point for communication with the user equipment via the access network path in response to the bandwidth being greater than or equal to the threshold value; and
   selecting the base station for communication with the user equipment in response to the bandwidth being less than the threshold value.

5. A method comprising:
   receiving, at a user equipment, a first number of packets over an air interface;
   determining, at the user equipment, inter-arrival packet delays for the first number of packets;
   estimating, at the user equipment, a bandwidth of the air interface based on the inter- arrival packet delays, a second number of probe packets used to generate the first number of packets, and a time interval for transmission of the second number of probe packets; and
   transmitting, from the user equipment, information indicating the bandwidth.

6. The method of claim 5, wherein receiving the first number of packets comprises receiving the first number of packets from an access point that generates the first number of packets based on the second number of probe packets generated by a base station.

7. The method of claim 6, further comprising:
switching from the access point to the base station for communication with the user equipment in response to the bandwidth being less than a threshold value.

8. The method of claim 5, wherein estimating the bandwidth comprises identifying a first subset of the first number of packets as aggregate packets including more than one probe packet and a second subset of the first number of packets as packets that include only one probe packet.

9. The method of claim 8, wherein estimating the bandwidth comprises determining a fraction of time in which the second subset is received by the user equipment and determining an average of the inter-arrival packet delays between the aggregate packets in the first subset.

10. The method of claim 9, wherein estimating the bandwidth comprises estimating the bandwidth based on the fraction of time, the average of the inter-arrival packet delays, and a modulation and coding scheme for downlink transmission over the air interface.

11. A base station comprising:
a transceiver to provide a first number of probe packets to an access point for transmission from the access point to a user equipment over an air interface and receive information indicating a bandwidth over the air interface estimated by the user equipment based on a second number of packets generated by the access point using the first number of probe packets; and
a processor to determine which of the base station or the access point to use for communication with the user equipment based on the bandwidth.

12. The base station of claim 11, wherein the transceiver is to provide information indicating at least one of a sequence number associated with the first number of probe packets, the first number, a probe interval during which the first number of probe packets are transmitted, and sequence numbers associated with each probe packet in the first number of the probe packets.

13. The base station of claim 11, wherein the processor is to determine whether to use the base station or the access point by comparing the bandwidth to a threshold value.

14. The base station of claim 13, wherein the processor is to select the access point for communication with the user equipment over the air interface in response to the bandwidth being greater than or equal to the threshold value, and wherein the processor is to select the base station for communication with the user equipment in response to the bandwidth being less than the threshold value.

15. A user equipment comprising:
a transceiver to receive a first number of probe packets over an air interface; and
a processor to determine inter-arrival packet delays for the first number of probe packets and estimate a bandwidth over the air interface based on the inter-arrival packet delays, a second number of probe packets used to generate the first number of packets, and a time interval for transmission of the second number of probe packets, and
wherein the transceiver is to transmit information indicating the bandwidth.

16. The user equipment of claim 15, wherein the transceiver is to receive the first number of packets from an access point that generates the first number of packets based on the second number of probe packets generated by a base station.

17. The user equipment of claim 16, wherein the transceiver is to switch from the access point to the base station for communication with the user equipment in an unlicensed frequency band in response to the bandwidth being less than a threshold value.

18. The user equipment of claim 15, wherein the processor is to identify a first subset of the first number of packets as aggregate packets including more than one probe packet and a second subset of the first number of packets as packets that include only one probe packet.

19. The user equipment of claim 18, wherein the processor is to determine a fractional time interval in which the second subset is received by the user equipment, and wherein the processor is to determine an average delay interval between the aggregate packets in the first subset.

20. The user equipment of claim 19, wherein the processor is to estimate the bandwidth based on the fractional time interval, the average delay interval, and a modulation and coding scheme for downlink transmission in an unlicensed frequency band.

* * * * *